United States Patent [19]

Richardson

[11] Patent Number: 5,262,973

[45] Date of Patent: Nov. 16, 1993

[54] METHOD AND APPARATUS FOR OPTIMIZING COMPLEX ARITHMETIC UNITS FOR TRIVIAL OPERANDS

[75] Inventor: Stephen Richardson, Stanford, Calif.

[73] Assignee: Sun Microsystems, Inc., Mountain View, Calif.

[21] Appl. No.: 851,465

[22] Filed: Mar. 13, 1992

[51] Int. Cl.[5] .............................................. G06F 7/38
[52] U.S. Cl. ........................,.......................... 364/736
[58] Field of Search ........................ 364/736, 715.01; 340/146.2

[56] References Cited

U.S. PATENT DOCUMENTS 4,392,208  7/1983  Burrows et al. .................... 364/900

Primary Examiner—Tan V. Mai
Attorney, Agent, or Firm—Blakely Sokoloff Taylor & Zafman

[57] ABSTRACT

When an arithmetic operation is to be performed, the operands are concurrently sent to the arithmetic unit to perform the complex arithmetic operation and into an operand check mechanism which determines whether one or both of the operands is a specific instance of a trivial operand. If one of the operands is a specific instance of a trivial operand, the complex arithmetic operations are halted and the check mechanism rapidly outputs the result of the arithmetic operation according to the trivial operand detected. Consequently, the need to perform complex arithmetic operations on trivial operands is avoided.

20 Claims, 6 Drawing Sheets

METHOD AND APPARATUS FOR OPTIMIZING COMPLEX ARITHMETIC UNITS FOR TRIVIAL OPERANDS

BACKGROUND OF THE INVENTION

1. Field of the Invention

The present invention relates to the field of arithmetic operations performed by a computer. More particularly, the present invention relates to trivial arithmetic computations performed on a computer.

2. Art Background

Computers execute tens of millions of operations every second. Many of the computations performed consist of highly redundant sequences of simple instructions and many of these instructions performed are trivial operations. However, complex arithmetic units to perform arithmetic operations, such as dividers, multipliers and adders, must contain sufficiently complex logic to handle the most complicated operation the arithmetic unit might perform. A divider, for instance, must be able to calculate a complex division such as 357.998324/8553.6001 as well as simpler fractions such as 2/1. In the past, thought has been given towards optimizing certain classes of operands. Multiplication by a 12-bit integer, for instance, might be completed more rapidly than multiplication by a 28-bit integer. However, little thought has been given towards optimizing a specific instance of an operand. This is due to the fact that optimizing an arithmetic function for specific instances of an operand is too costly. Furthermore, the payoff for such an operation is generally believed too small to be worth the effort.

SUMMARY OF THE INVENTION

It is therefore an object of the present invention to provide a method for decreasing the amount of time required to perform arithmetic operations on certain trivial operands.

In the present invention, the need to perform complex arithmetic operations on trivial operands is avoided. When an arithmetic operation is to be performed, the operands are concurrently sent to the arithmetic unit to perform the complex arithmetic operation and into an operand check mechanism which determines whether one or both of the operands is a specific instance of a trivial operand. If one of the operands is a specific instance of a trivial operand, the complex arithmetic operations are halted and the check mechanism rapidly outputs the result of the arithmetic operation according to the trivial operand detected.

BRIEF DESCRIPTION OF THE DRAWINGS

The objects, features and advantages of the present invention will be apparent to one skilled in the art from the following description of the invention in which.

DETAILED DESCRIPTION OF THE INVENTION

Figure 1:
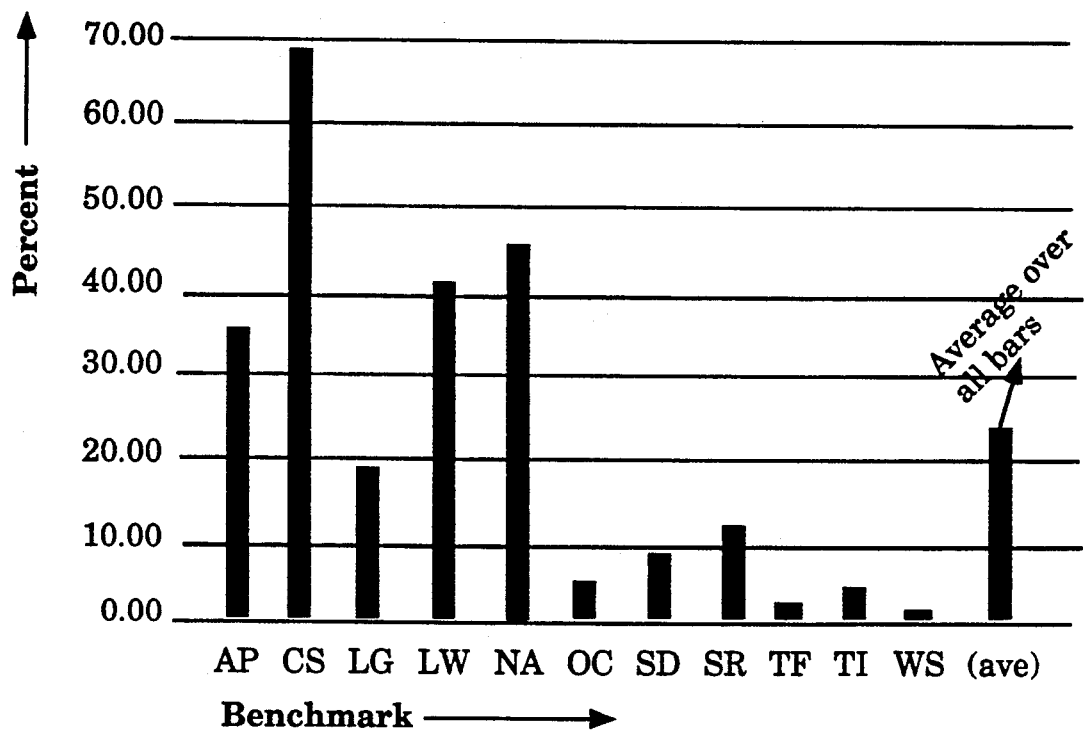
FIG. 1 illustrates in an exemplary benchmark suite the percent of integer multiplication operations which include trivial operands.

In the following description for purposes of explanation, specific memories, organizations, components, architectures, etc. are set forth in order to provide the understanding of the present invention. However, it will be apparent to one skilled in the art that the present invention may be practiced without the specific details and in other instances well-known circuitry is shown in block diagram form in order to not obscure the present invention unnecessarily.

A closer examination as to the frequency of trivial operands occurring in applications reveals that the frequency of occurrence is significant. For example, it has been found that in many applications the frequency of occurrence of multiplication operations in which trivial operands are used is quite significant. A trivial operand for a given arithmetic functional unit is any number such that, if the functional unit were optimized to handle only this number as one of its operands, it would increase the speed and/or reduce the complexity of the unit. For example, if the arithmetic operation is multiplication, 0, −1 and 1 are considered trivial operands because the result of the multiplication operation is either the value of the second operand (possibly with a sign change) for the case of −1 and 1 or the value of 0 when one of the operands is equal to 0. Similarly, if the arithmetic operation is addition, 0 is considered a trivial operand because the result of the arithmetic operation will be the value of the other operand. If the arithmetic operation is multiplication or division, operands which are powers of two can be considered as trivial operands because the result can be simply determined by a left or right bit shift of the binary value of the other operand. Furthermore, if some arbitrary number, such as 3.1416, were deemed sufficiently important, dedicated logic could be built such that multiplication by this constant would occur more rapidly than the general case. Note that zero as a divisor is not normally a trivial operand, as it represents a special case that must be handled separately anyway.

The following discussion focuses on the arithmetic operation of multiplication. However, this is exemplary and the concept described herein can be easily extended to other arithmetic operations in which trivial operands exist.

Integer multiplication is often implemented as a multiple instruction sequence of lower level operations. Floating-point multiplication also tends to take multiple cycles. The table below shows, for various existing designs, the number of cycles required to perform certain floating-point multiplication operations.

| System | Multiplication Time | |
| --- | --- | --- |
| Motorola MC68881 | 71+ | cycles |
| Intel 80960 | 12-36 | cycles |
| DEC VAX 4000/300 | 15 | cycles |
| DEC VAX 8700 | 15 | cycles |
| Cypress CY7C602 (SPARC) | 5 | cycles single precision |
| | 7 | cycles double precision |
| MIPS R2010 | 4 | cycles single precision |
| | 5 | cycles single precision |

(Intel is a registered trademark of Intel Corporation; Motorola is a registered trademark of Motorola Corporation; DEC and VAX are registered trademarks of Digital Equipment Corporation; SPARC is a registered trademark of SPARC International; and MIPS is a registered trademark of MIPS Computer Systems, Inc.)

It can be seen that while most machine level instructions are expected to take on the order of one to two cycles, multiplication can take many more cycles depending on the implementation. Detection of multiplicative operands having values of 0, 1, or −1 and the subsequent emission of the appropriate result is a simple operation that should take no more than single cycle on even the crudest of implementation.

FIG. 1 illustrates the percent of integer multiply operations found to be trivial in a benchmark suite referred to as the Perfect Club which consists of a set of statically large and dynamically very large numerical based programs used typically to benchmark scientific computers. For further information, see, Lyle Kipp, *Perfect Club Benchmark Suite I Documentation*, Center for Supercomputing Research and Development, University of Illinois, July 1989.

Figure 2:
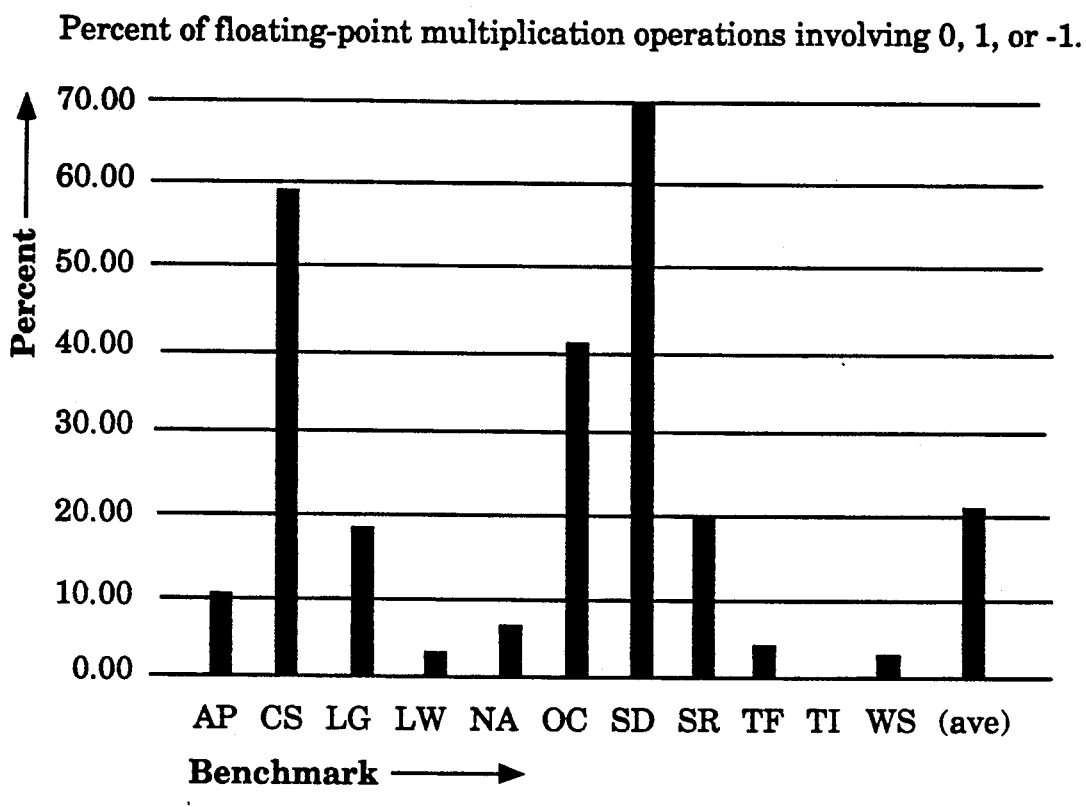
FIG. 2 illustrates the percent of floating point multiplication operations which include trivial operands.

FIG. 2 illustrates the percent of floating-point multiplication operations which were found to include trivial operands in the same benchmark suite. It can be seen that a significant number of cycles can be saved by detecting a trivial operand and rapidly and simply determining the results of the arithmetic operation involving the trivial operand.

Figure 3:
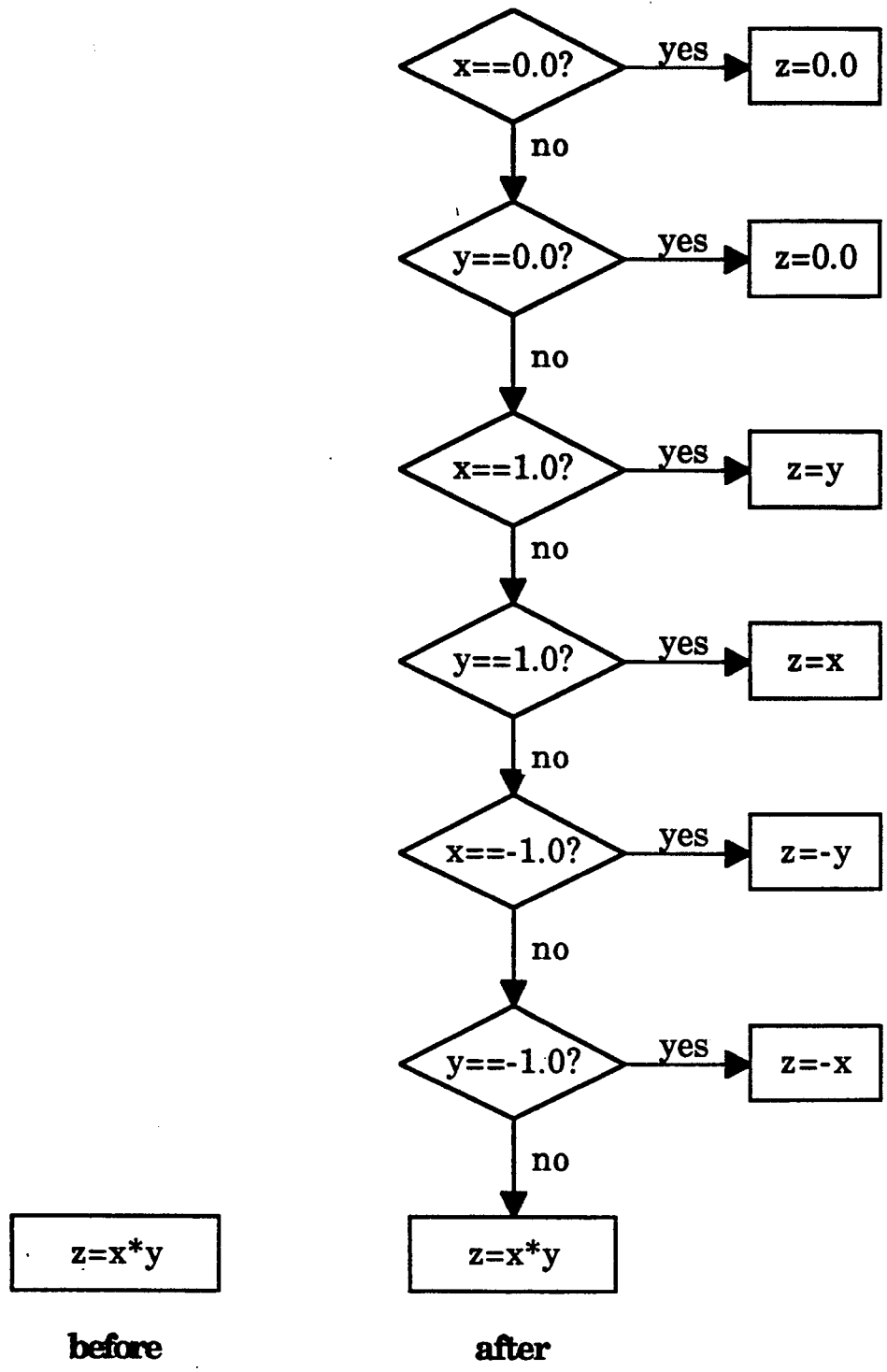
FIG. 3 is a flow diagram illustrating the optimization of floating point multiplication operations for trivial operands −1.0, 0.0, and 1.0.
Figure 4A:
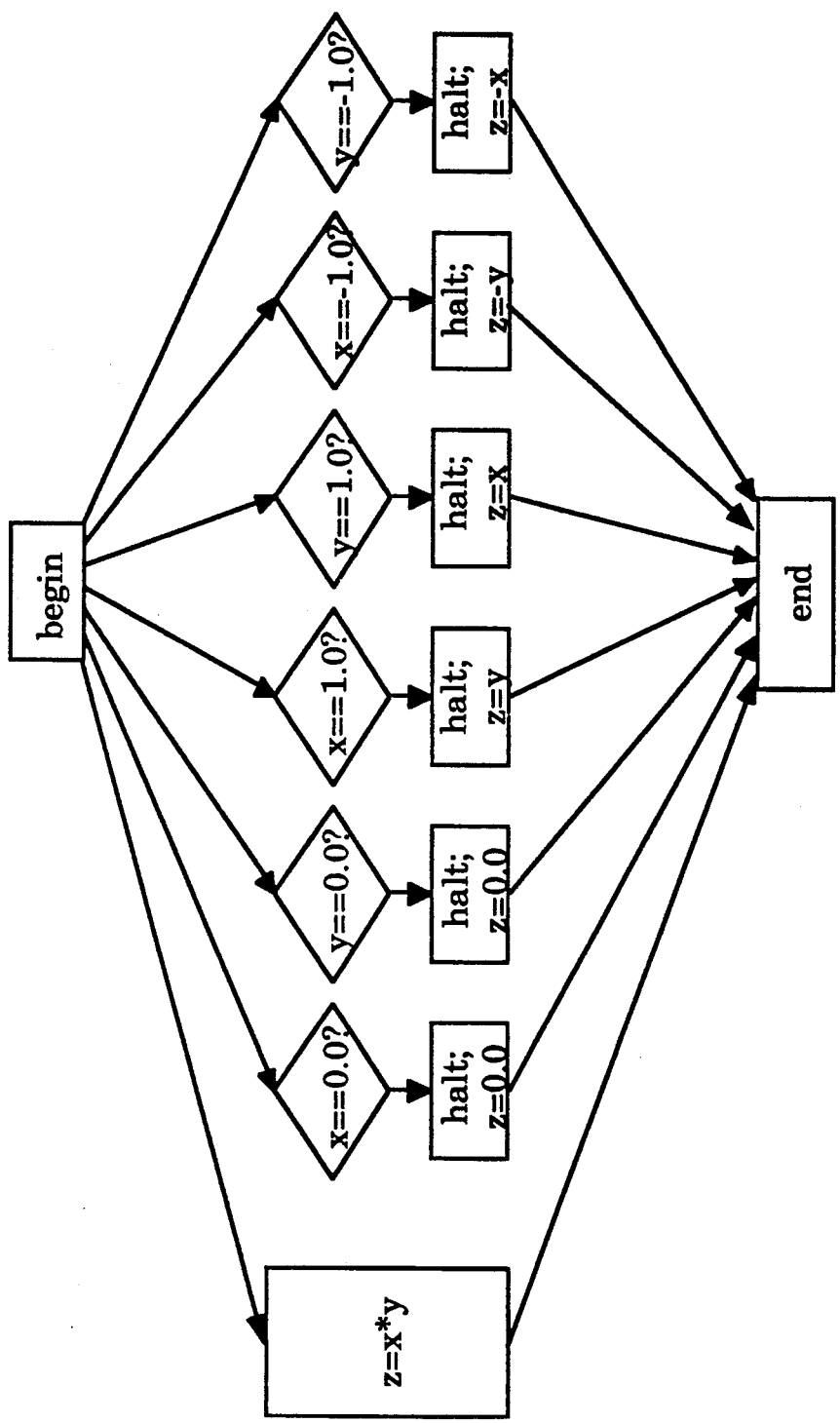
FIGS. 4a and 4b are flow diagrams illustrating a preferred embodiment for the optimization of arithmetic operations for certain trivial operands.

A flow diagram illustration of the trivial operand optimizer of the present invention is shown in FIG. 3. The operands are tested to determine whether the operands are trivial operands. In the following illustration, multiplication is the arithmetic operation and −1, 0 and 1 are specified as trivial operands. If either operand, i.e., x or y, has the value of −1, 0 or 1, the result, z, is easily determined without the need to perform the complex arithmetic computation. However, this sequence is only advantageous if the overhead of sequentially checking each operand for triviality counters any positive effect or reflected in cycle time savings. Therefore, referring to FIG. 4a, it is preferred that the determination of the existence of a trivial operand should be performed in parallel with the execution of complex arithmetic operations.

The operands are immediately input to the arithmetic unit to perform the complex arithmetic operation. At the same time, these operands are input to detection mechanisms, such as comparators, which detect the presence of a specific trivial operand. If a trivial operand is determined, simple logic outputs the result known because of the existence of the trivial operand and a halt command is issued to the unit performing the complex arithmetic operation. If neither operand is a trivial operand, a halt instruction is not issued and the complex arithmetic operation will continue to completion to generate a result.

Figure 4B:
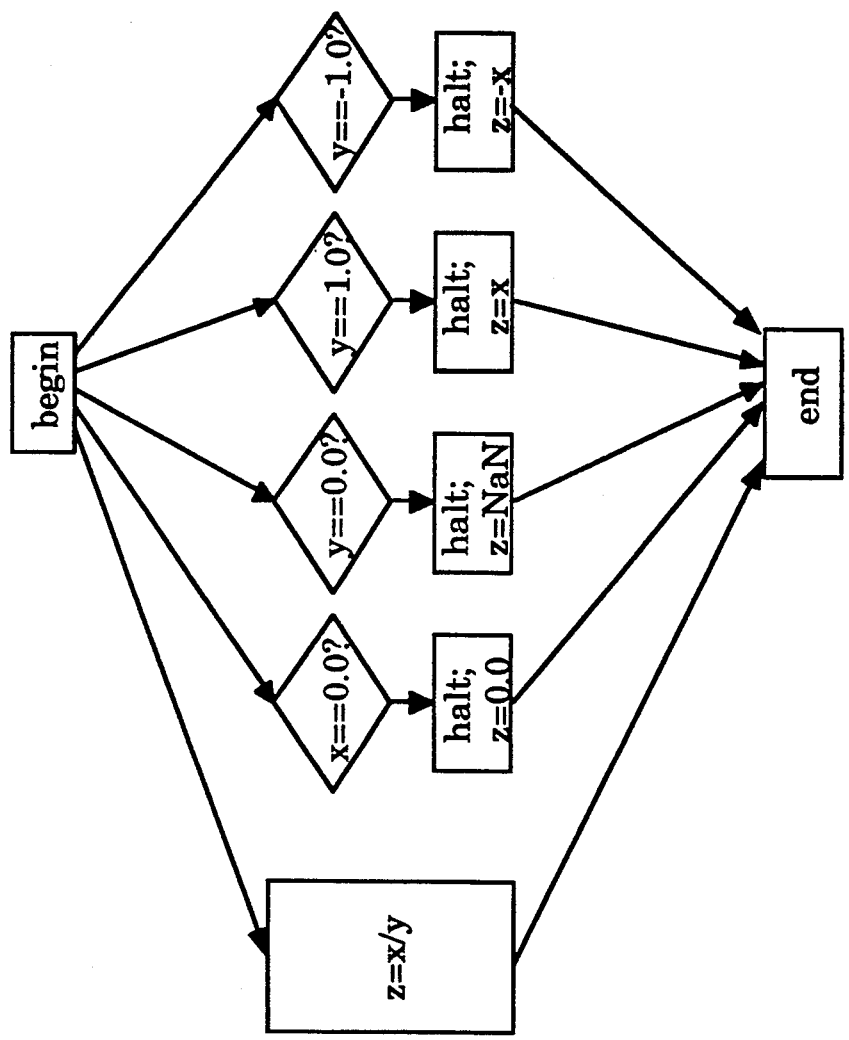

FIG. 4b similarly illustrates this optimization for the arithmetic operation of division. If the dividend is equal to 0, the result is 0. Similarly, if the divisor has a value of 0, 1 or −1, the operation is trivial as the values are easily determined to respectively be not a real/integer number, the value of the dividend and the inverse sign of the value of the dividend.

Figure 5:
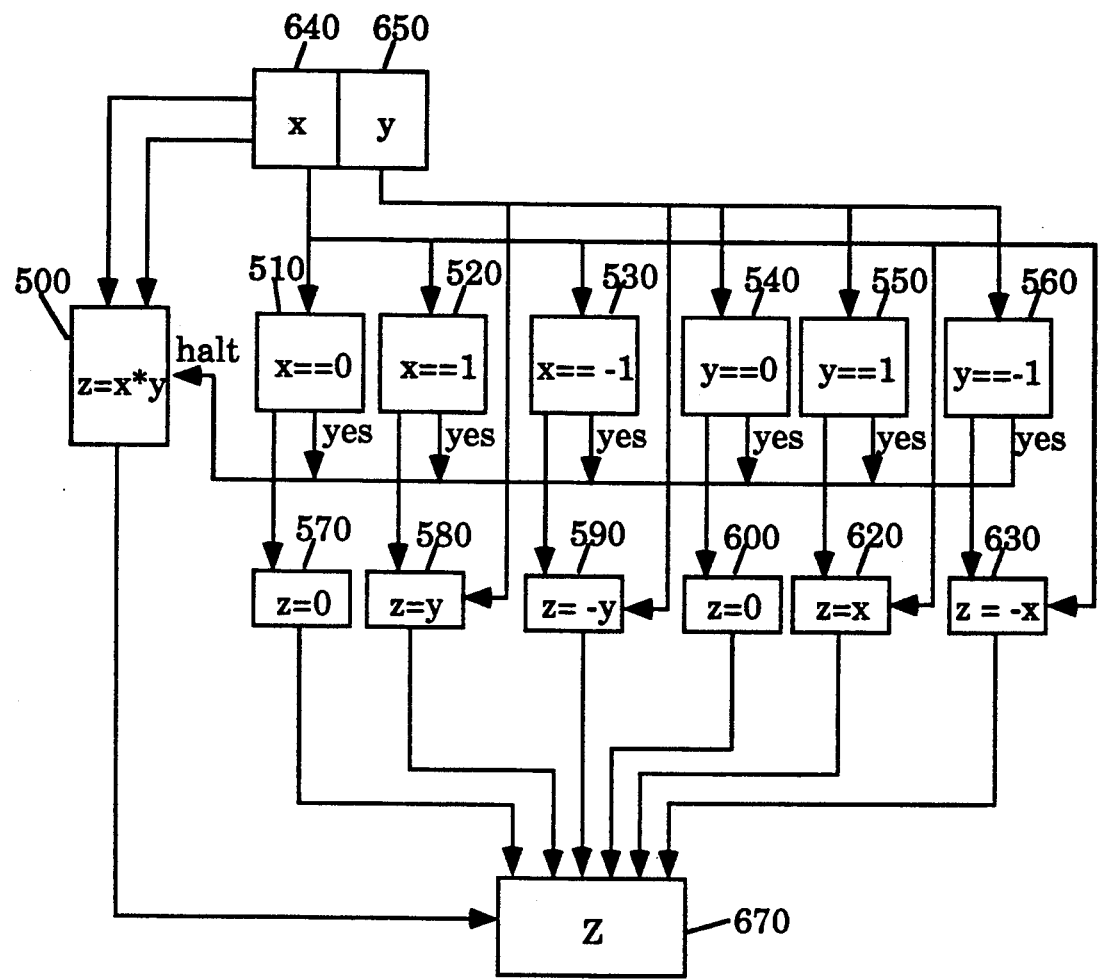
FIG. 5 illustrates another embodiment of the apparatus for optimizing arithmetic operations for certain trivial operands.

FIG. 5 is a block diagram of presentation of an exemplary unit that performs arithmetic operations, in particular, multiplication, in accordance with the optimization techniques of the present invention. The operands x and y 640, 650 are input concurrently to the complex arithmetic unit, a multiplier, 500 which performs the complex multiplication of the operands x and y, and also, concurrently input to comparators 510, 520, 530, 540, 550 and 560 to determine if either operand is a trivial operand. In the present illustration, a trivial operand is specified to be a value of 0, 1 and −1. Registers 570, 580, 590, 600, 620 and 630 store the concurrently determined results for the instances of trivial operands. If any of the tests performed by comparators 510–560 result in a positive response indicating that one of the operands is a trivial operand, a halt signal is issued by the comparator to the multiplier 500 and an output signal is issued to the corresponding register 570, 580, 590, 600, 620 and 630 which outputs immediately the result. Therefore, Z register 670 the time required for performing a complex multiplication operation is utilized only when the multiplication involves non-trivial operands resulting in substantial time savings and increasing the overall computation speed of the system.

Although the invention has been described in conjunction with the preferred embodiment, it is evident that numerous alternatives, modifications, variations and uses will be apparent to those skilled in the art in light of the foregoing description. In particular, other logic components may be used in place of the registers and comparators shown in FIG. 5.

Further, the present invention can be extended to not only division but also to other arithmetic operations such as a square root operation. In addition, the range of trivial operands can be expanded to include other values which can be considered trivial because the result is a simple function of one or both of the operands and can be done in a very short period of time. In particular, the range of trivial operands can be expanded to values which are a power of two because these trivial operands translate into bit shifts of binary representations of operands when performing multiplication and division operations. Also, as mentioned earlier, the present invention can be used to improve performance for the occurrence of a particular constant as an operand.

What is claimed is:

1. An optimization apparatus for performing arithmetic operations on one or more operands, said optimization apparatus comprising:

an arithmetic unit including halt means for performing complex arithmetic operations, one or more operands being input to said arithmetic unit for each arithmetic operation being performed, said arithmetic unit generating a result for the arithmetic operation unless terminated by said halt means;

detection means coupled to said arithmetic unit for detecting the existence of a trivial operand, said detection means coupled to receive one or more operands for the arithmetic operation to be performed concurrently with the arithmetic unit, said detection means generating an enabling signal identifying a trivial operand when a trivial operand is detected;

trivial operand result means coupled to the detection means for generating the result of the arithmetic operation when at least one of the operands is a trivial operand, said trivial operand result means receiving said signal identifying a trivial operand and generating the result of the arithmetic operation based on said trivial operand identified; and arithmetic control means coupled to the detection means and to the arithmetic unit, said arithmetic control means issuing a halt signal to halt the arithmetic unit from performing the arithmetic operation when a trivial operand is detected;

whereby a result for the arithmetic operation is generated without the need to perform the arithmetic operation in the arithmetic unit when at least one of the operands is a trivial operand.

2. The optimization apparatus as set forth in claim 1, wherein said detection means comprises at least one comparator for comparing at least one operand with at least one trivial operand.

3. The optimization apparatus as set forth in claim 1, wherein said detection means comprises a plurality of comparators, each comparator comparing one operand to a value indicative of a trivial operand.

4. The optimization apparatus as set forth in claim 3, wherein said plurality of comparators is structured to perform the comparisons in parallel.

5. The optimization apparatus as set forth in claim 1, wherein said trivial operand result means comprises at least one register which stores an operand when the result of the operation for a trivial operand is an operand or a constant when the result of the operation for a trivial operand is a constant, said trivial operand result means outputting the result when a trivial operand is detected.

6. The optimization apparatus as set forth in claim 1, wherein said trivial operand result means comprises at least one binary shift register which stores an operand and performs a bit shift of the operand when the result of the operation for a trivial operand is a bit shift of an operand, said trivial operand result means outputting the result when a trivial operand is detected.

7. The optimization apparatus as set forth in claim 1, wherein said trivial operand is a value which enables the result to be easily determinative from a second operand or a constant value.

8. The optimization apparatus as set forth in claim 1, wherein said trivial operand is a value which enables the result to be easily determinative by performing bit shifts of the binary value of an operand.

9. The optimization apparatus as set forth in claim 1, wherein said trivial operand is a value which enables the result to be easily determinative by performing a simple logical operation on the remaining operand.

10. The optimization apparatus as set forth in claim 1, wherein said arithmetic operation is multiplication and said trivial operand is a value of −1, 0 or 1.

11. The optimization apparatus as set forth in claim 1, wherein said arithmetic operation is division and said trivial operand is a value of 0 when the operand is a divisor and a value of 0, 1 or −1 when the operand is a dividend.

12. The optimization apparatus as set forth in claim 1, wherein said arithmetic operation is multiplication and said trivial operand is a value which is a multiple of two.

13. The optimization apparatus as set forth in claim 1, wherein said arithmetic operation is division and said trivial operand is a value which is a multiple of two.

14. A method for optimizing arithmetic operations performed by an arithmetic unit, said method comprising the steps of:
providing an arithmetic unit including halt means for performing complex arithmetic operations;
providing one or more operands to said arithmetic unit for each arithmetic operation being performed so that said arithmetic unit generates a result for the arithmetic operation unless terminated by said halt means;
detecting the existence of a trivial operand from one or more operands input to said arithmetic unit by comparing said operands input to trivial operands;
generating an enabling signal identifying a trivial operand when a trivial operand is detected;
generating the result of the arithmetic operation based on said enabling signal when at least one of the operands is a trivial operand; and
issuing a halt signal to halt the arithmetic unit from performing the arithmetic operation when a trivial operand is detected,
whereby a result for the arithmetic operation is generated without the need to perform the arithmetic operation in the arithmetic unit when at least one of the operands is a trivial operand.

15. The method as set forth in claim 14, wherein the step of detecting trivial operands comprises the step of comparing at least one operand to values indicative of trivial operands.

16. The method as set forth in claim 15, wherein the step of comparing compares the operand to the values indicative of trivial operands in parallel.

17. The method as set forth in claim 15, wherein the step of generating the result generates the result from an operand or a constant value.

18. The method as set forth in claim 15, wherein the step of generating the result generates the result by performing bit shifts of the binary value of an operand.

19. The method as set forth in claim 14, wherein the step of generating the result generates the result by performing a simple logical operation on the remaining operand.

20. An optimization apparatus for performing arithmetic operations on one or more operands, said optimization apparatus comprising:
an arithmetic unit including a halt function for performing complex arithmetic operations, one or more operands being input to said arithmetic unit for each arithmetic operation being performed, said arithmetic unit generating a result for the arithmetic operation unless terminated by said halt function;
a plurality of comparators coupled to said arithmetic unit for detecting the existence of a trivial operand, said plurality of comparators coupled to receive one or more operands for the arithmetic operation to be performed concurrently with the arithmetic unit, said plurality of comparators generating an enabling signal identifying a trivial operand and issuing a halt signal to halt the arithmetic unit from performing the arithmetic operation when a trivial operand is detected; and
a plurality of trivial operand registers coupled to the comparators for generating the result of the arithmetic operation when at least one of the operands is a trivial operand, said plurality of trivial operand registers receiving said signal identifying a trivial operand and generating the result of the arithmetic operation based on said trivial operand identified,
whereby a result for the arithmetic operation is generated without the need to perform the arithmetic operation in the arithmetic unit when at least one of the operands is a trivial operand.

* * * * *